US009313390B2

(12) United States Patent
Velarde et al.

(10) Patent No.: US 9,313,390 B2
(45) Date of Patent: Apr. 12, 2016

(54) SYSTEMS AND METHODS TO CALIBRATE A MULTI CAMERA DEVICE

(75) Inventors: Ruben M. Velarde, Chula Vista, CA (US); Szepo Robert Hung, Carlsbad, CA (US); Kohsia S. Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1004 days.

(21) Appl. No.: 13/083,276

(22) Filed: Apr. 8, 2011

(65) Prior Publication Data

US 2012/0257065 A1 Oct. 11, 2012

(51) Int. Cl.

| | |
|---|---|
| ***H04N 5/232*** | (2006.01) |
| ***H04N 5/225*** | (2006.01) |
| ***H04N 17/00*** | (2006.01) |
| ***H04N 13/02*** | (2006.01) |

(52) U.S. Cl.

CPC ......... *H04N 5/2258* (2013.01); *H04N 5/23212* (2013.01); *H04N 13/0239* (2013.01); *H04N 13/0296* (2013.01); *H04N 17/002* (2013.01)

(58) Field of Classification Search

CPC ............ H04N 5/2258; H04N 13/0239; H04N 13/0296; H04N 5/23212; H04N 17/002

USPC .......................................................... 348/345

See application file for complete search history.

(56) References Cited

U.S. PATENT DOCUMENTS

| | | | | |
|---|---|---|---|---|
| 5,202,555 | A * | 4/1993 | Ishida et al. | 250/201.8 |
| 7,209,161 | B2 | 4/2007 | Thal et al. | |
| 7,259,784 | B2 | 8/2007 | Cutler | |
| 2001/0010556 | A1 | 8/2001 | Sugimoto et al. | |
| 2003/0210329 | A1 * | 11/2003 | Aagaard et al. | 348/159 |
| 2004/0174434 | A1 * | 9/2004 | Walker et al. | 348/211.3 |
| 2005/0117034 | A1 | 6/2005 | Cutler | |
| 2006/0187312 | A1 * | 8/2006 | Labaziewicz et al. | 348/218.1 |
| 2008/0095523 | A1 | 4/2008 | Schilling-Benz et al. | |
| 2008/0218612 | A1 * | 9/2008 | Border et al. | 348/262 |
| 2008/0219654 | A1 * | 9/2008 | Border et al. | 396/89 |
| 2009/0000350 | A1 * | 1/2009 | Magnussen et al. | 73/1.74 |
| 2009/0207236 | A1 | 8/2009 | Feda | |
| 2010/0079604 | A1 | 4/2010 | Washisu | |
| 2010/0238272 | A1 | 9/2010 | Cameron et al. | |

(Continued)

FOREIGN PATENT DOCUMENTS

| | | | |
|---|---|---|---|
| EP | 2282549 | A2 | 2/2011 |
| EP | 2369392 | A1 | 9/2011 |
| JP | H06300962 | A | 10/1994 |
| JP | H11223757 | A | 8/1999 |
| JP | 2001208948 | A | 8/2001 |
| JP | 2003295044 | A | 10/2003 |
| JP | 2009134058 | A | 6/2009 |
| JP | 2010085471 | A | 4/2010 |
| JP | 2010204385 | A | 9/2010 |
| JP | 2010204483 | A | 9/2010 |
| JP | 2011022501 | A | 2/2011 |
| WO | 2010071173 | A1 | 6/2010 |
| WO | WO2011118078 | A1 | 9/2011 |

OTHER PUBLICATIONS

International Search Report and Written Opinion—PCT/US2012/032607, International Search Authority—European Patent Office, Jul. 19, 2012.

*Primary Examiner* — Roberto Velez
*Assistant Examiner* — Tuan Le

(57) ABSTRACT

Present embodiments contemplate systems, apparatus, and methods to calibration a multi camera device. Particularly, present embodiments contemplate initiating a calibration of multiple cameras in response to a predetermined event. A calibration records current environmental conditions along with the sensor positions of each camera when focused. By recording a plurality of calibration points under a variety of imaging and environmental conditions, a more accurate synchronization of the multiple cameras' focus positions can be achieved.

21 Claims, 9 Drawing Sheets

100
Temp Sensor 105
Orientation Sensor 104
Image Sensor 103
Image Sensor 102
115
110
Memory 106
Calibration Collection Module 195
Data Collection Module 190
Data Storage Module 180
Offset Determination Module 170
Multi-Focus Module 150
Processor 101
Memory 107
Calibration Table 200
Working Memory 160

(56) References Cited

U.S. PATENT DOCUMENTS

2011/0012997 A1 1/2011 Koguchi
2011/0075018 A1* 3/2011 Kohama ........................ 348/348
2011/0242356 A1* 10/2011 Aleksic et al. ............. 348/222.1
2012/0002958 A1* 1/2012 Muukki ........................ 396/325
2014/0055629 A1* 2/2014 Ochi et al. ................. 348/208.1

* cited by examiner

Calibration Table

| DateTime | Sensor 1 Position | Sensor 2 Position | Temp | Orientation |
|---|---|---|---|---|
| | | | | |
| | | | | |
| | | | | |
| | | | | |
| | | | | |

FIG. 2

SYSTEMS AND METHODS TO CALIBRATE A MULTI CAMERA DEVICE

TECHNICAL FIELD

The present embodiments relate to imaging devices, and in particular, to methods, apparatus, and systems for the calibration of two or more camera sensors integrated into a single device.

BACKGROUND

In the past decade, digital imaging capabilities have been integrated into a wide range of devices, including digital cameras and mobile phones. Recently, device manufacturers have introduced devices integrating multiple digital imaging sensors in one device. A wide range of electronic devices, including mobile wireless communication devices, personal digital assistants (PDAs), personal music systems, digital cameras, digital recording devices, video conferencing systems, and the like, can make use of multiple imaging sensors to provide capabilities and features to their users. These capabilities include higher dynamic range imaging, panoramic imaging, and stereoscopic (3D) imaging applications such as 3D movies.

To provide these new advanced applications, the multiple cameras of a device are calibrated to work together. Applications such as stereoscopic imaging require at least two cameras to focus on the same subject. Furthermore, during the recording of a 3D movie, the focal distance of the camera sensors will frequently change, requiring each camera to react simultaneously and in unison with the other camera to maintain a clear image.

To achieve a synchronized focus, devices with a plurality of imaging sensors are usually calibrated during the manufacturing process. The device is placed into a special "calibration mode" on the manufacturing line, with the imaging sensors pointed at a target image designed to ensure consistent focus. Each camera of the device is then focused on the target image and its focus position recorded by a calibration station. The two recorded focus positions are then stored in a non-volatile memory of the device. Alternatively, an offset may be generated between the two focus positions instead and stored in the non-volatile memory. When the product is later purchased and used, the mobile device consults the prerecorded calibration data to set lens positions during use.

This calibration process has several disadvantages. First, it takes up time during the manufacturing process, increasing the cost of the device. Second, any calibration data produced during manufacturing is static in nature. As such, it cannot account for changes in lens calibration as the device ages. For example, the piezo electric motors controlling the focus position in many of the small imaging sensors embedded in today's mobile devices may lose efficiency over time. In some imaging sensor embodiments, for example those using a voice coil type actuator, this results in less camera lens adjustment for a given applied voltage as the camera sensor ages. Other embodiments may require more electronic pulses or commands to achieve a particular lens position as the sensor ages. To the extent an imaging device calibration relies on a fixed differential voltage between two imaging sensors, misalignment of imaging sensor focal distances are likely after significant device usage. This divergence in focal distances causes final images to be less clear, ultimately effecting customer satisfaction.

Ensuring a precise focus is further complicated by variations in lens focal distance with temperature and orientation. Calibrations taken at the factory are generally performed at either a horizontal or vertical orientation. Multiple orientations are typically not calibrated. Nor is device temperature typically a consideration in factory calibrations. Performing these multiple calibrations at different temperatures or orientations would add to manufacturing time, and the cost of equipment needed to control the temperature of the device during these calibration steps may also add significant cost.

SUMMARY

Some of the present embodiments may comprise a method for determining a focus adjustment for an imaging device having a plurality of cameras. The method may comprise the determining of a first focus setting for a first camera in response to a predetermined event. The method may further comprise the determining of a second focus setting for a second camera in response to the predetermined event, and determining a focus adjustment based on a difference between the first focus setting and the second focus setting. In some embodiments, the focus adjustment may be determined based on the differences in a plurality of focus settings. In other embodiments, the predetermined event is the power on event of the imaging device. In alternate embodiments, the predetermined event is the elapsing of a predetermined time between the recordation of calibration points. In other embodiments, the method may further comprise storing of the first focus setting and the second focus setting. In some embodiments, the method may also comprise the storing of environmental data collected contemporaneously with the first focus setting and the second focus setting. In some embodiments, the environmental data may include ambient temperature and/or device orientation, Other present embodiments may comprise an imaging device, including a first camera and a second camera. The imaging device may also include a processor, configured to control the focus settings of the first camera and the second camera. The imaging device may also comprise a control module, configured to determine a first focus setting for the first camera in response to a predetermined event, and to determine a second focus setting for the second camera in response to the predetermined event, and to determine a focus adjustment based on a difference between the first focus setting and the second focus setting. Other embodiments of the imaging device may also include a temperature sensor, wherein the control module is configured to determine a focus adjustment also based on a measurement from the temperature sensor. Other embodiments of the imaging device may further comprise an orientation sensor, wherein the control module is configured to determine a focus adjustment also based on a measurement from the orientation sensor. Alternative embodiments of the imaging device may include a mobile phone. Other embodiments of the imaging device may comprise a hand held camera.

Some embodiments of the imaging device may comprise a third camera, wherein the processor is also configured to control the focus setting of the third camera, and the control module is configured to also determine a third focus setting for the third camera and to determine a second focus adjustment based on a difference between the first focus setting and the third focus setting.

Other embodiments may comprise a non-transitory computer readable medium containing processor executable instructions that are operative to cause a processor to determine a first focus setting for a first camera in response to a predetermined event. This embodiment may further comprise the determination of a second focus setting for a second camera in response to a predetermined event, and the determination of a focus adjustment based on a difference between the first focus setting and the second focus setting. In other embodiments, the computer readable medium includes further instructions to cause the processor to determine the first focus setting and the second focus setting by selecting a high contrast image from a plurality of images. Some embodiments may comprise additional processor executable instructions, causing the processor to determine the focus adjustment based at least partially on the ambient temperature of at least one of the plurality of cameras. Other embodiments include instructions that cause the processor to determine the focus adjustment based at least partially on a device orientation.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 2 is an illustration of one embodiment of a calibration table. The calibration table is used to store calibration information related to the camera lens positions.

DETAILED DESCRIPTION

Implementations disclosed herein provide systems, methods and apparatus for calibrating multiple camera lenses in a mobile electronic device. Particularly, the present embodiments contemplate determining a focus adjustment based on a difference between the focus positions of at least two cameras or camera sensors. One skilled in the art will recognize that these embodiments may be implemented in hardware, software, firmware, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 1:
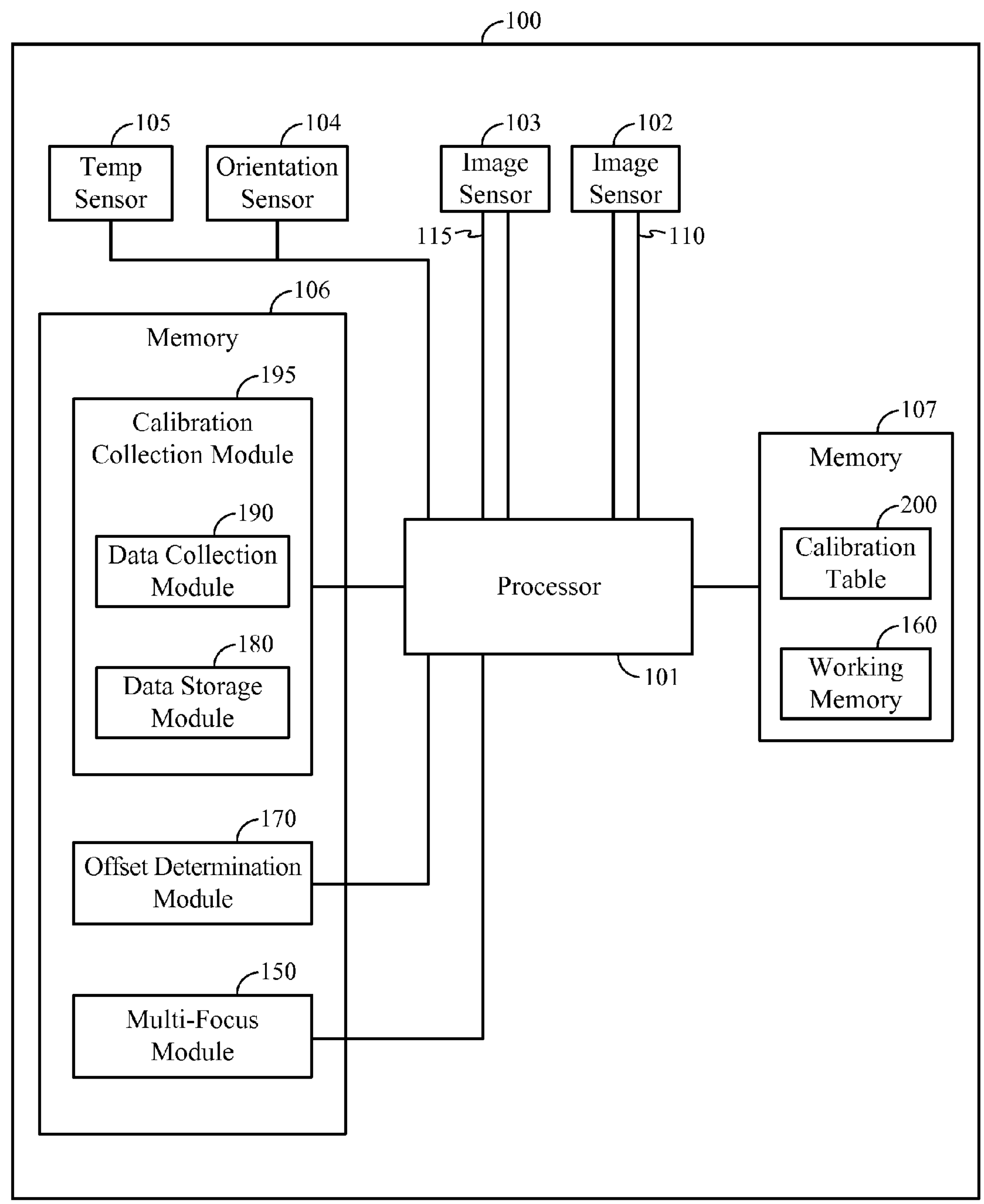
FIG. 1 is a block diagram depicting a device implementing some operative embodiments of the invention disclosed. The major components of a mobile device are illustrated.

FIG. 1 depicts a high-level block diagram of a device 100 having a set of components including a processor 101 linked to two imaging sensors 102 and 103. A temperature sensor 105, orientation sensor 104 and a memory 106 are also in communication with the processor 101. The illustrated embodiment also includes a separate memory module 107 linked to the processor and that includes a calibration table 200 and a working memory 160.

Device 100 may be a cell phone, digital camera, personal digital assistant, or the like. Device 100 may also be a more stationary device such as a desktop personal computer, video conferencing station, or the like. A plurality of applications may be available to the user on device 100. These applications may include high dynamic range imaging, panoramic video, or 3D imaging such as 3D images or 3D video.

Processor 101 may be a general purpose processing unit or a processor specially designed for imaging applications. As shown, the processor 101 is connected to a memory 106 and the memory 107. In the illustrated embodiment, the memory 106 stores a calibration collection module 195 having a data collection module 190 and data storage module 180. The memory 106 also has an offset determination module 170 and a multi-focus module 150. The memory 107 has a calibration table 200 and a working memory 160. As mentioned above, the processor is configured by several modules stored in the memories. The data collection module 190 includes instructions that configure the processor 101 to adjust the focus position of image sensor 102 and image sensor 103. The data storage module 180 provides instructions that configure the processor 101 to store the focus position data determined by the data collection module 190 into the calibration table 200. The offset determination module 170 is configured to instruct the processor to calculate a proper offset for at least one image sensor when camera focus is required to support an imaging application. The multi-focus module 150 is configured to instruct the processor 101 to focus the image sensors, based at least partially on output from the offset determination module 170.

Although FIG. 1 depicts a device comprising separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 1 illustrates two memory components, to include memory component 106 comprising several modules, and a separate memory 107 comprising a calibration table 200 and a working memory 160, one with skill in the art would recognize several embodiments utilizing different memory architectures. For example, a design may utilize ROM or static RAM memory for the storage of processor instructions implementing the calibration collection module 195, offset determination module, 170 and multi-focus module 150. Lower cost dynamic access memory (RAM) may be used as the working memory. In one embodiment, the calibration table 200 may be stored in a static RAM component, and then loaded into a dynamic RAM component at system start time. Alternatively, processor instructions may be read at system startup from a disk storage device that is integrated into device 100 or connected via an external device port. The processor instructions may then be loaded into RAM to facilitate execution by the processor.

Figure 2:
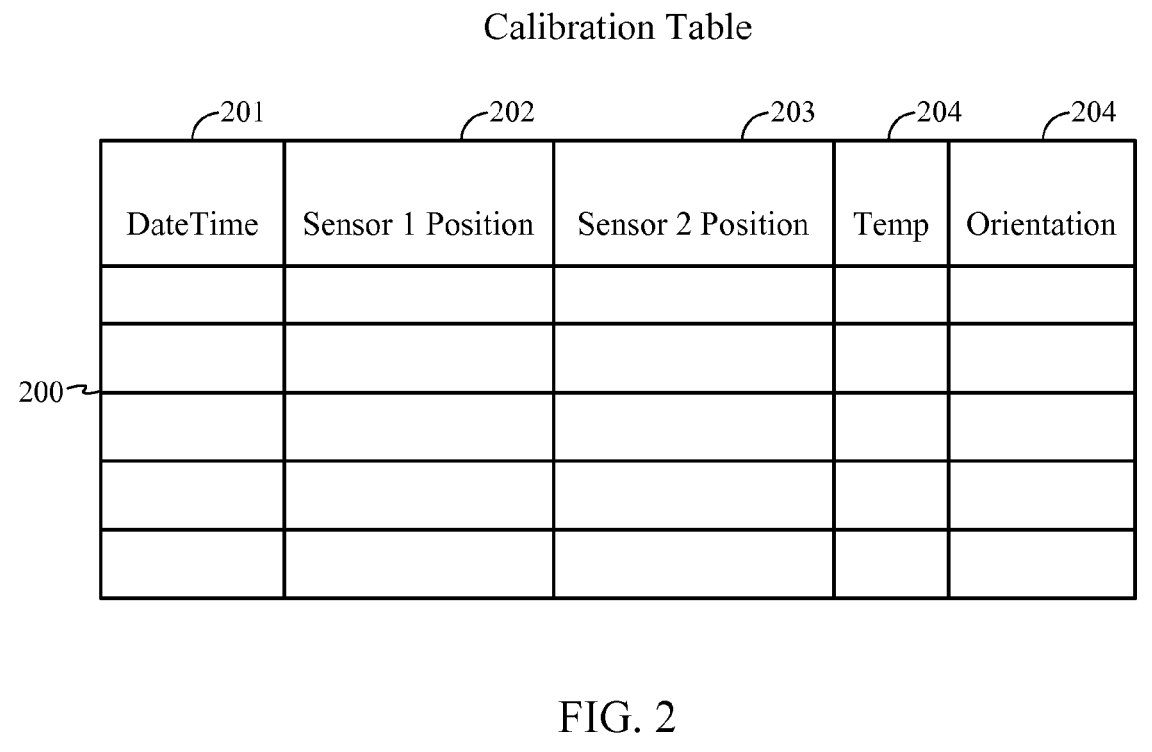

FIG. 2 illustrates one embodiment of the calibration table 200 as shown in FIG. 1. The calibration table 200 stores data obtained from a series of calibration operations that occur as the device is being used. In the illustrated embodiment, each entry in the calibration table 200 stores the date and time of when the entry was recorded in column 201. Date and time information provides insight into the relevancy of a calibration entry when later used to calculate a lens position for a slave imaging sensor. For example, a calibration point recorded several years ago may not provide accurate data for calculating a proper lens adjustment at the present time, due to image sensor wear occurring since the point was recorded.

In the illustrated embodiment, each entry of the calibration table also includes the ambient temperature at the time of calibration in column 204. Ambient temperature may have a significant effect on the relationship between a lens control (such as a voltage level, a number of voltage pulses, or commands) and a lens position. By recording the ambient temperature, the offset determination module 170, discussed in more detail below, is able to choose calibration points with matching temperatures or otherwise compensate for temperature variations when calculating the best offset (and therefore a lens position) for a particular imaging operation. Alternative embodiments may not integrate an ambient temperature sensor and thus would omit the temperature column from the calibration table.

Since device orientation may also affect the focal distance of the imaging sensor, the embodiment illustrated by FIG. 2 also records, in column 205, the device's orientation in three dimensional space at the time the calibration point is recorded. However, as with the temperature sensor, lower cost embodiments of a device may not include an integrated orientation sensor. In these embodiments, the orientation column 205 is omitted from the calibration table.

In some embodiments, lens position information for each sensor is recorded with each calibration entry. The embodiment illustrated in FIG. 2 has two image sensors, resulting in two columns for sensor position information, 202 and 203. Alternative embodiments store only a difference in master and slave lens focus positions, calculated at the time of calibration. This design may reduce calibration table memory requirements by requiring only one column to store focus position information for a calibration entry. However, storing only a difference in lens position may limit accuracy of any extrapolation from a master lens position performed by the offset determination module. This is discussed in more detail below. This is especially true when a current master lens position differs significantly from a master lens position recorded in the calibration entry.

In yet another embodiment, sensor position information stored in the calibration table may comprise a percent difference between the master and slave positions. This also reduces memory requirements as compared to an embodiment storing the lens position of both sensors. Percentage differences may be more readily applied to differing master lens positions, but they also assume a linear relationship between master and slave positions.

Figure 3:
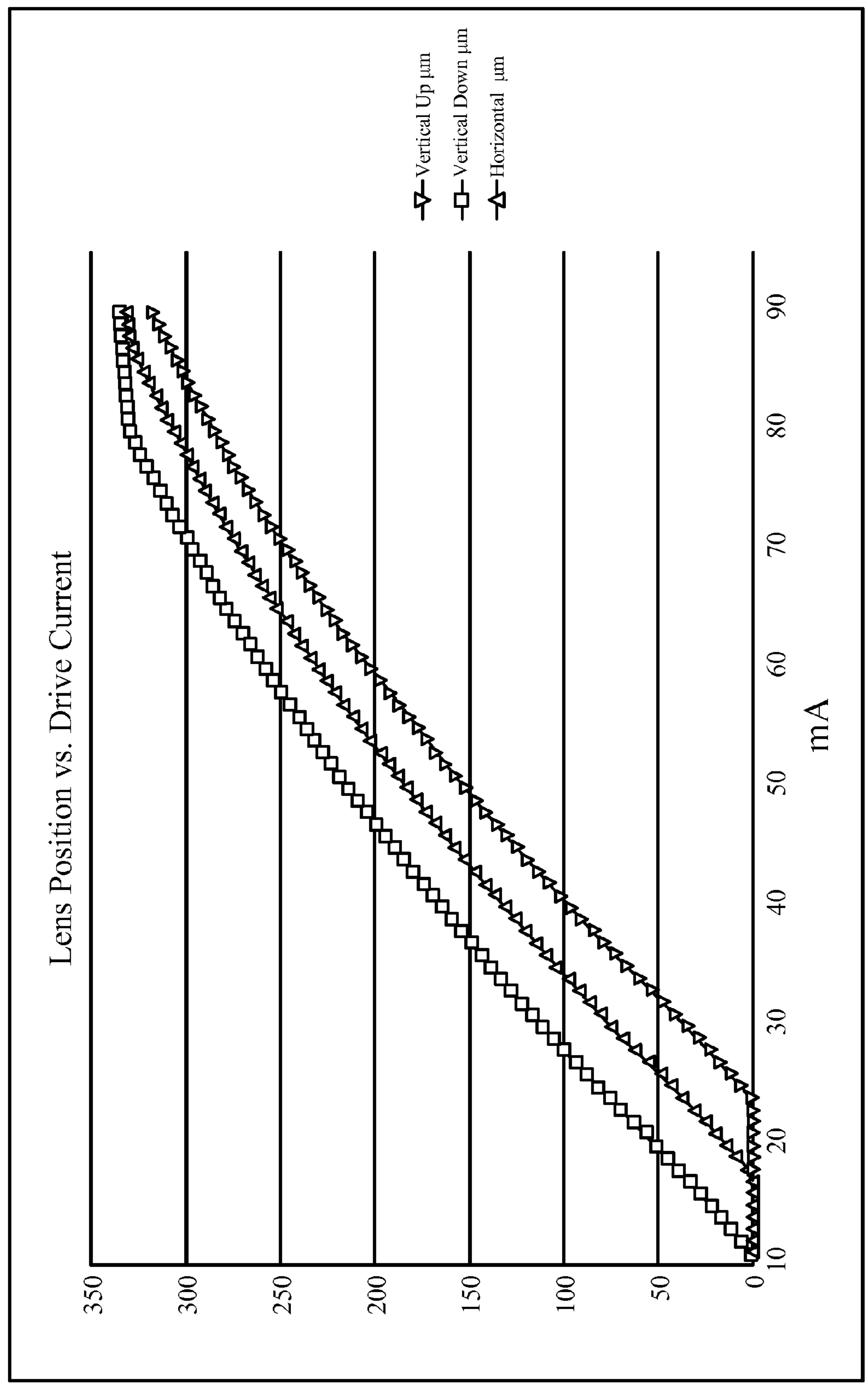
FIG. 3 is a graph depicting how the focal distance of an imaging sensor varies with device orientation. Focal positions of a device positioned such that the optical axis is oriented upward, downward, or horizontal are depicted.

The effect of device orientation on the relationship between a lens control (such as voltage, pulses, or commands) and lens position is illustrated by the line graph of FIG. 3. The data in this figure was collected with a sensor with a voice coil actuator. With this particular design, a small current is applied to the coil to focus the lens. As the current is increased, the lens position changes so as to provide a variable focal position. In this test data as shown in FIG. 3, when the optical axis of the sensor was horizontal, a current of 50 milliamps resulted in sensor movement of 183 um. However, when the optical axis was pointing upward, the same 50 milliamp current applied to the imaging sensor motor resulted in sensor movement of about 153 um. When the sensor was pointed downwards, the same 50 mA current resulted in 213 um of movement of the sensor. Thus, there is a large percentage variation in sensor movement, given the same current applied to a sensor motor, depending on upwards/downwards/or horizontal orientation of the sensor.

Figure 4:
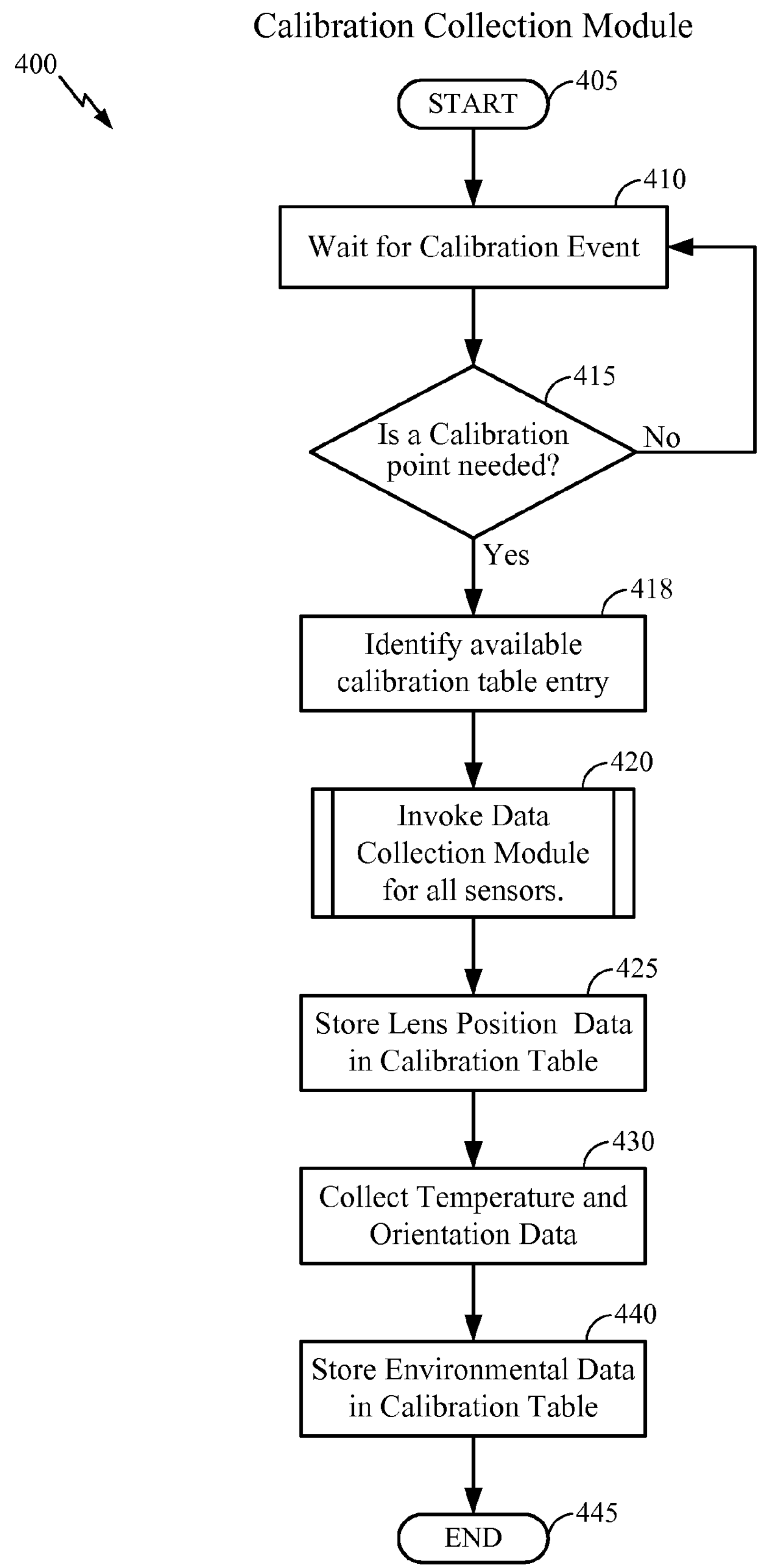
FIG. 4 is a flow chart depicting one embodiment of processing logic for a calibration collection module.

FIG. 4 is a flow chart illustrating a process 400 that runs within one embodiment of the data collection module 190. The process 400 begins at a start state 405 and then moves to a decision state 410 to wait for a calibration event. In some embodiments, this event is the power on event of the imaging device. In other embodiments, the user may initiate a calibration event in response to the selection of a device setting or the like.

Once a determination is made that the calibration event occurs, process 400 moves to decision step 415 and determines whether it is necessary to capture a calibration point at the present time. A calibration point may be unnecessary at the predetermined calibration event for several reasons. For example, there may already be a calibration point for the current device temperature and orientation conditions. Alternatively, the calibration table may have an adequate sampling of calibration points, such that an adequate interpolation to the current orientation and temperature can be performed. If no calibration point is needed, process 400 returns to decision step 415 to wait for the next calibration event to occur. The need for a calibration point will be reevaluated again at that time.

If step 415 determines that a calibration point should be collected, process 400 moves to step 418, where an available calibration entry row in the calibration table is identified. A calibration entry row will be needed to store the data about to be collected by process 400. If no calibration entry row is available, the process 400 may either create a new row, or delete older data in the calibration table. After an empty row in the calibration table has been identified, the process 400 moves to step 420 and invokes the data collection module 190 to perform the collection of calibration data. One skilled in the art will recognize the method used in step 415 to invoke the data collection module 190 will vary across embodiments. For example, a messaging system provided by the operating system of the device may be used. Alternatively, the calibration collection module may invoke a method of the data collection module 190 directly. The details of the data collection module 190 are discussed in more detail below.

After data is collected, instructions in the data collection module 190 return the data to the calibration collection module. Process 400 then moves to step 425 to store the data received from the data collection module into the empty row in calibration table 200. Process 400 then moves to step 430 to obtain data from an integrated temperature sensor and orientation sensor. Process 400 then moves to step 430 where the environmental data collected from the orientation sensor and/or accelerometer is stored in the calibration table 200.

One with skill in the art will recognize that what constitutes a calibration event in step 410 may vary across embodiments. For example, other embodiments wait for the device to become idle before triggering a calibration event. If an idle device can be accurately detected and the calibration performed at that time, the calibration point is unlikely to interfere with a user's use of the device. Embodiments taking this approach implement intelligent processes to determine specifically when a device becomes idle. One embodiment waits for a certain period of time to elapse without any user input. Alternatively, data from built in accelerometers or orientation sensors can detect whether a device has been moved within a certain period of time. A lack of movement can signal an idle condition. Yet other embodiments may combine the two techniques. For example, if no user input is received for a certain time, and the device has not been moved in the same time period, then a higher confidence idle determination can be made. In some embodiments, the time parameters used in the idle determination can also be made user configurable. This provides the user with some control over how device calibrations are done, making them more accepting of device calibrations when they occur.

In other embodiments, the calibration event is triggered by intelligent algorithms detecting the need for a calibration. For example, a device can compare the contrast of captured images at adjusted lens positions. Significant differences may indicate the need for a calibration. When the need for a calibration is detected, the user can be prompted with a message indicating this, and requesting the user's assent to initiate a calibration. If the user consents, a calibration can be initiated. Alternatively, instead of prompting the user, the need for a calibration can be stored in a non-volatile memory. A calibration point can then be initiated at the least disruptive time, for example at the next device power on event.

Some embodiments may take this approach a step further. For example, when image contrast at adjusted lens positions deviates between sensors by a small amount, an embodiment only suggests to the user that a calibration be performed. However, when deviations reach a larger threshold, the embodiment forces a calibration. Such measures may be justified to ensure the manufacturer of the device is not unfairly perceived as marketing low quality devices.

While the specific calibration event may vary across embodiments, other aspects of process 400 may also vary. For example, embodiments may manage free space in the calibration table 200 differently. As calibration points are recorded, the space available in the calibration table 200 is reduced. If no space remains in the calibration table 200 when a calibration is performed, a replacement algorithm is needed to identify a storage location for the newly collected data. One embodiment recognizes that as calibration entries age, the data they contain becomes less useful in predicting the current behavior of the image sensors, because wear of the sensors may change the imaging sensor's response profiles. To compensate, the calibration entries are "aged out" of the calibration table 200. Older calibration points are deleted after a certain period of time to make room for new, more relevant calibration data.

Alternatively, a "least recently used" replacement process may be employed in some embodiments. With this design, calibration points less frequently referenced by the offset determination module 170 (described in detail below) are eliminated to provide room for data that is more frequently used and valuable in determining lens positions. Such an algorithm requires additional data to be stored in each calibration entry. This information records when the entry is accessed. The techniques utilized to implement this design are well known in the art.

One disadvantage of a least frequently used replacement algorithm for lens calibration points is that it results in clustering of calibration data around frequently used conditions, but provides relatively sparse data coverage for less common environmental conditions. With sparse data coverage for infrequent conditions, the interpolation algorithms employed by the offset determination module 170 (described below) will be less accurate. This could adversely impact image quality under those conditions. Additionally, the clustering of calibration points around frequently encountered environmental conditions may only marginally improve image quality under those conditions. Once the number of calibration points for a given environmental condition reaches an "adequate" level, the interpolation algorithms will typically provide a satisfactory result. Increasing the number of calibration points beyond an adequate level may simply consume space in the memory without providing improvement in image quality. These trade offs are carefully considered when determining which type of replacement algorithm a particular embodiment will employ.

Calibrations that occur too frequently or at inopportune times must also be avoided. Therefore, some embodiments of the process 400 may require a minimum elapsed time between calibration points to avoid overburdening the device and impacting the user experience.

Figure 5:
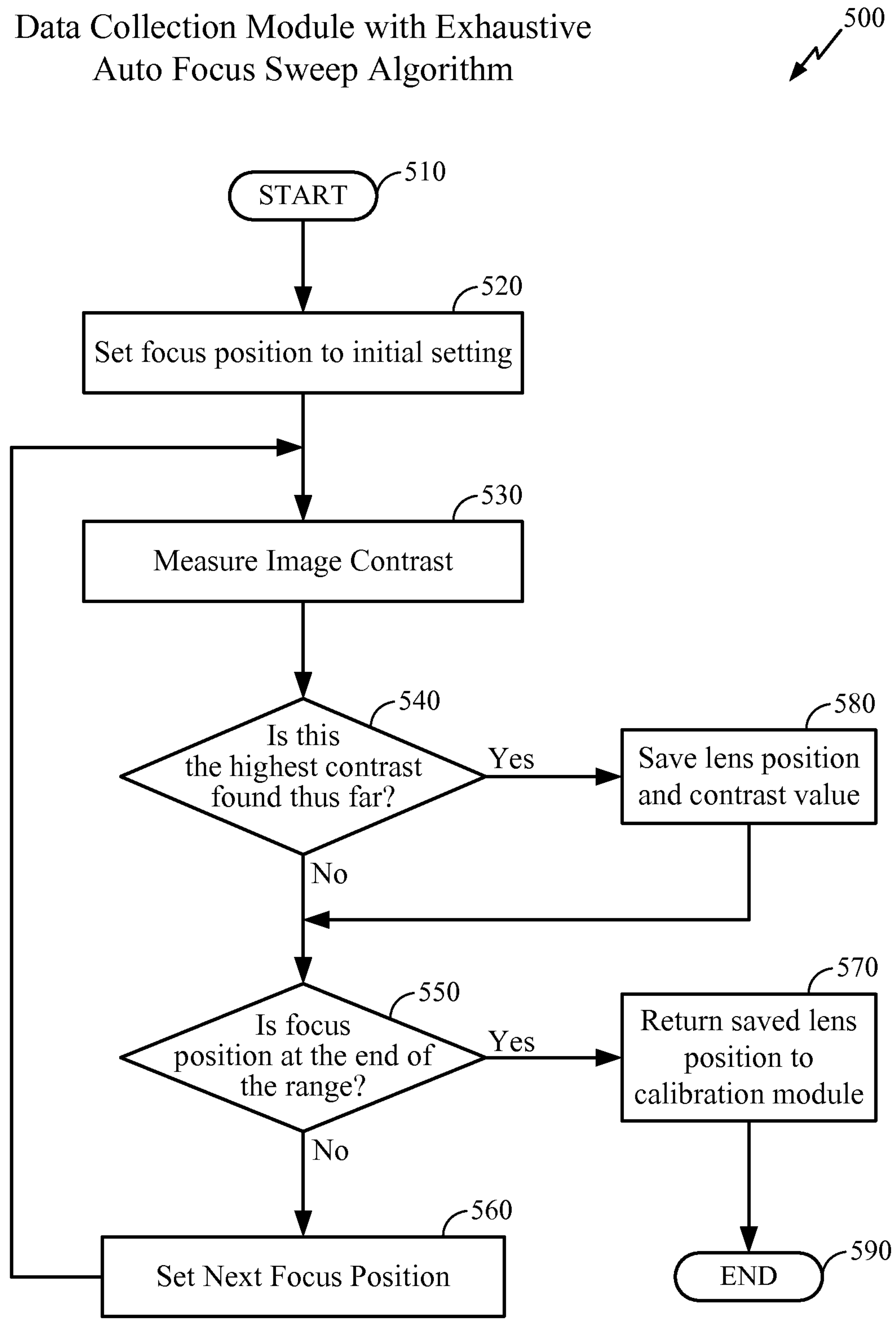
FIG. 5 is a flow chart depicting one embodiment of a data collection module utilizing an exhaustive focus sweep algorithm.

FIG. 5 is a flow chart illustrating a process 500 that runs within one embodiment of the data collection module 190. Process 500 collects data for a calibration point after the decision to perform a calibration has been made by the calibration collection module. In the illustrated embodiment, the process 500 utilizes an exhaustive auto focus sweep to collect the calibration data. In this embodiment, the illustrated process is performed for each imaging sensor in parallel. The process 500 begins at start step 510 and then moves to step 520 to set the focus position for the lens to an initial setting. The initial setting is typically at one extreme end of the range of the imaging sensor's lens positions. Process 500 then moves to step 530 where the contrast of an image captured through the imaging sensor at the lens position set in step 520 (or step 560, see below) is measured. Process 500 then moves to decision step 540 wherein the contrast is compared to previously measured contrast values. If the current contrast is greater than the maximum prerecorded value, process 500 moves to step 580 and the current lens position and contrast values are saved. If this is the very first measurement of contrast, process 500 also moves to step 580 to store the contrast and lens position and initialize the data values.

Process 500 then moves to decision step 550. In this step the data process 500 determines if the current lens focus position represents the furthest extent of the imaging sensor's focus position range. If the lens position is at the furthest extent of its range, process 500 moves to step 570 and returns the saved lens position to the calibration module. Process 500 then moves to end state 590. If the furthest extent of the lens position adjustment has not been reached in step 550, then process 500 moves to step 560, where the lens position is advanced to the next position. Process 500 then returns to step 530 and the process repeats.

An exhaustive auto focus sweep, as depicted in the embodiment illustrated in FIG. 5, ensures that the very highest contrast image is used to synchronize the positions of two or more lenses. By utilizing the highest contrast image, the impact of any variation between the image data for each imaging sensor is mitigated. Slight variations in captured data from the multiple image sensors could cause the lens positions resulting in the highest contrast images to differ for reasons other than variations in lens focal length. Image sensor noise, for example, could result in slight variations in maximum contrast between the two sensors. By focusing on the point of highest contrast, the effects of noise on the point of maximum contrast are mitigated, resulting in the most accurate calibration. Thus, a data collection module utilizing the exhaustive focus sweep comprises one possible means for determining a focus setting for a camera in response to a predetermined event. While providing the most accurate result, an exhaustive image sweep requires slightly more time and power to perform a calibration than other embodiments such as the abbreviated auto focus sweep discussed next.

Figure 6:
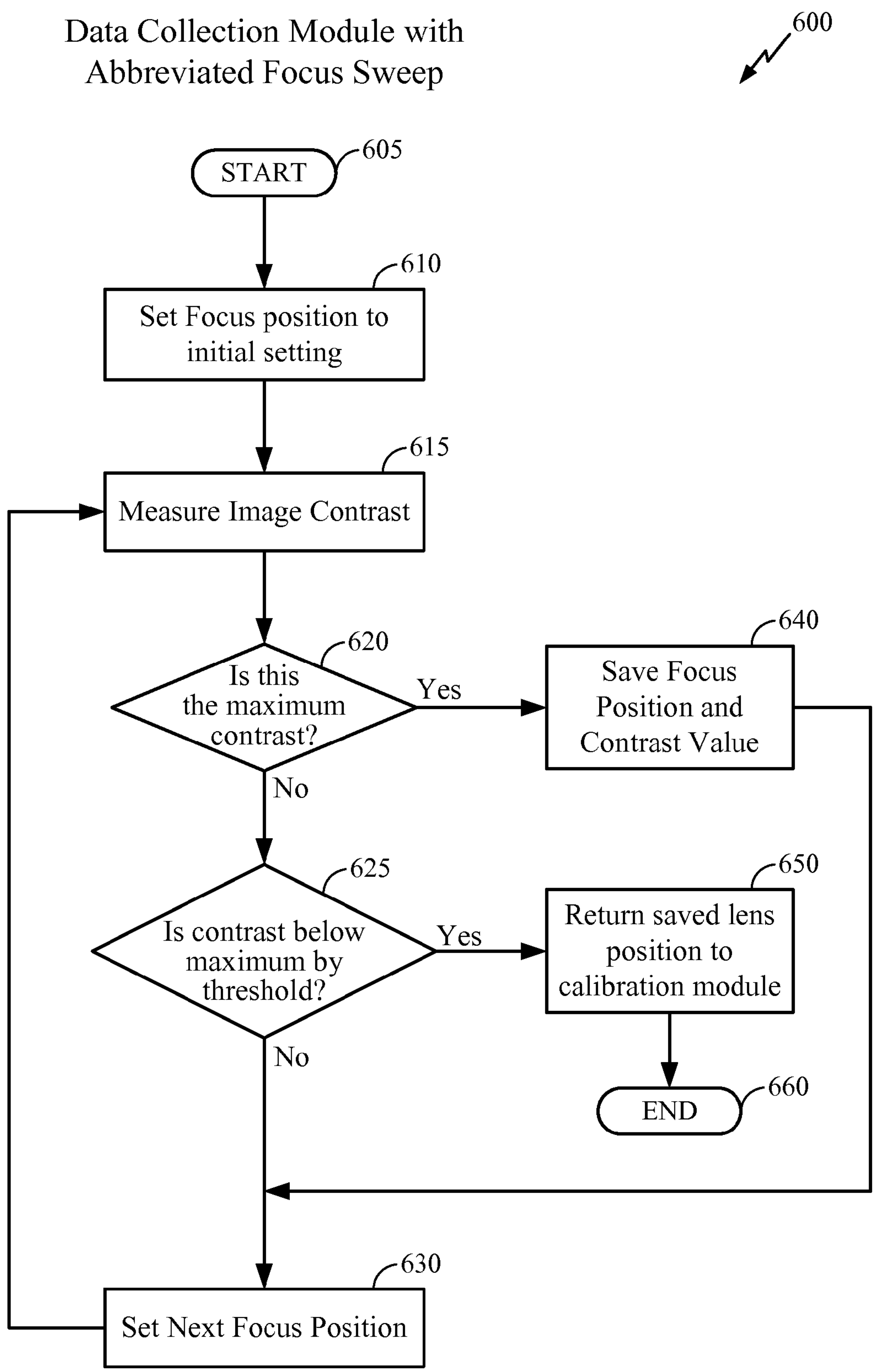
FIG. 6 is a flow chart depicting one embodiment of a data collection module utilizing an abbreviated auto focus sweep algorithm.

In an alternative embodiment illustrated by FIG. 6, the data collection module does not sweep the entire range of lens focus positions. Instead, the abbreviated auto focus sweep seeks only a local maximum contrast. FIG. 6 is a flow chart illustrating a process 600 that runs within one embodiment of the data collection module 190. The process 600 begins at start state 605 and then moves to step 610 where an initial focus position is set. Similar to process 500, this focus position also typically represents one end of the focus range. Process 600 then moves to step 615 where the contrast of the image viewed through the lens at the focus position set in step 610 is measured. Process 600 then moves to step 620, where the measured contrast is compared against the maximum contrast value seen during this invocation of process 600. If the current measured contrast is higher than the maximum seen, process 600 moves to step 640, and the current focus position and its contrast value are saved. Process 600 then moves to step 630, where the focus position is advanced. Process 600 then returns to step 615 and process 600 repeats. If the contrast at the current lens position is below the maximum contrast ever recorded in step 640, process 600 moves to step 625. Step 625 is unique to the abbreviated auto focus sweep algorithm described in process 600. In step 625, the difference between the contrast at the current lens position and the maximum contrast is compared to a threshold value. If the difference is above the threshold, there is no need to continue to advance the lens position to the very end of its range, as is done in process 500. Instead, process 600 moves to step 650, where the saved lens position is returned to the calibration module. Process 600 then moves to end step 660.

The abbreviated auto focus sweep technique provides advantages in some environments. For example, it may require less time and power to perform than an exhaustive auto focus sweep. Additionally, if the threshold value is set properly, image noise does not result in a false match between lens positions. To ensure this, the threshold should be set higher than any noise level the sensors may experience. Significant margin can be designed into the system by setting the threshold significantly higher than any expected noise level, without sacrificing the benefits of the abbreviated technique. Thus, a data collection module utilizing the abbreviated auto focus sweep comprises another possible means for determining a focus setting for a camera in response to a predetermined event.

Figure 7A:
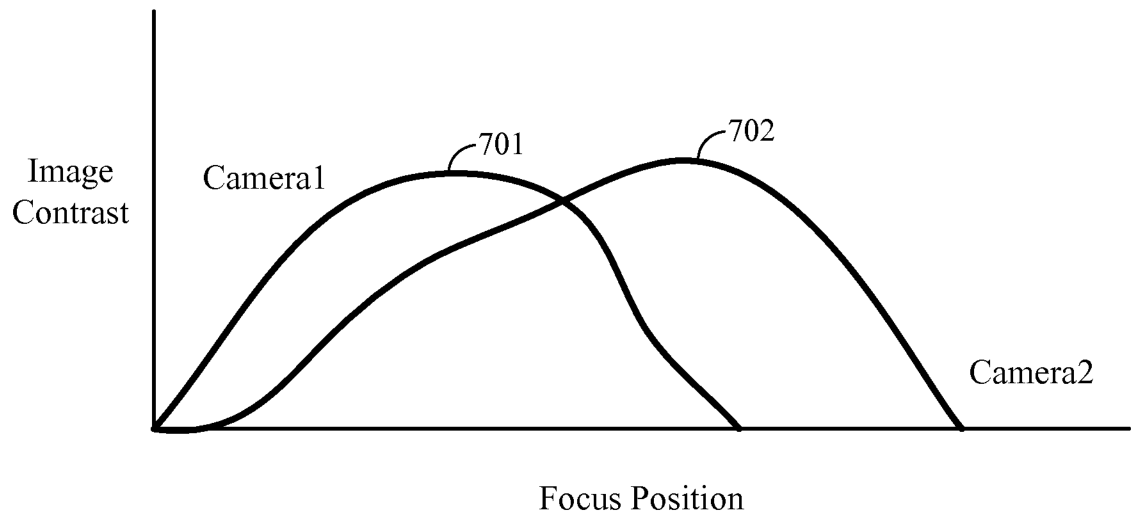
FIG. 7 is a graph depicting the contrast of an image viewed through an imaging device's imaging sensor as the focus position of the imaging sensor advances. Both the exhaustive auto focus sweep and abbreviated auto focus sweep are illustrated.
Figure 7B:
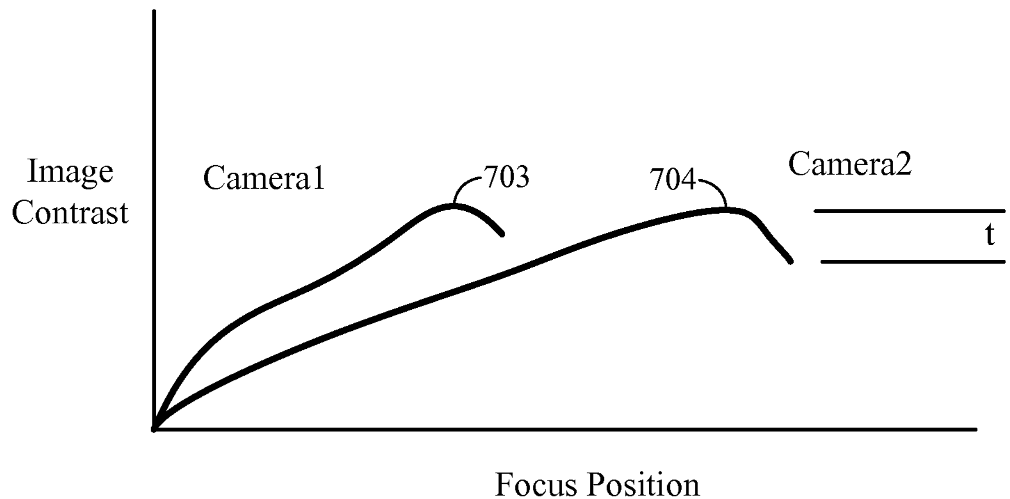

The differences between the exhaustive and abbreviated auto focus sweep are illustrated in FIGS. 7A and 7B. The top graph 7A illustrates a typical exhaustive auto focus sweep. As the focus position advances to the right, the image slowly comes into focus, represented by steadily increasing image contrast. Eventually, the image reaches maximum focus, represented as points 701 for camera 1 and 702 for camera 2. As the lens position continues to advance further, the image loses focus, represented by declining image contrast after points 701 and 702.

Compare with the bottom graph 7B, representing an abbreviated auto focus sweep technique. Similar to the exhaustive auto focus sweep, contrast initially increases as the lens focus position is advanced. However, after a maximum contrast is recorded, the lens focus position is only advanced until image contrast falls below a set threshold marked as "t" in the Figure. Then the data collection process ends. There is no need to continue to advance the focus position beyond a lens position producing a contrast differing from the maximum contrast by more than the threshold value.

Figure 8:
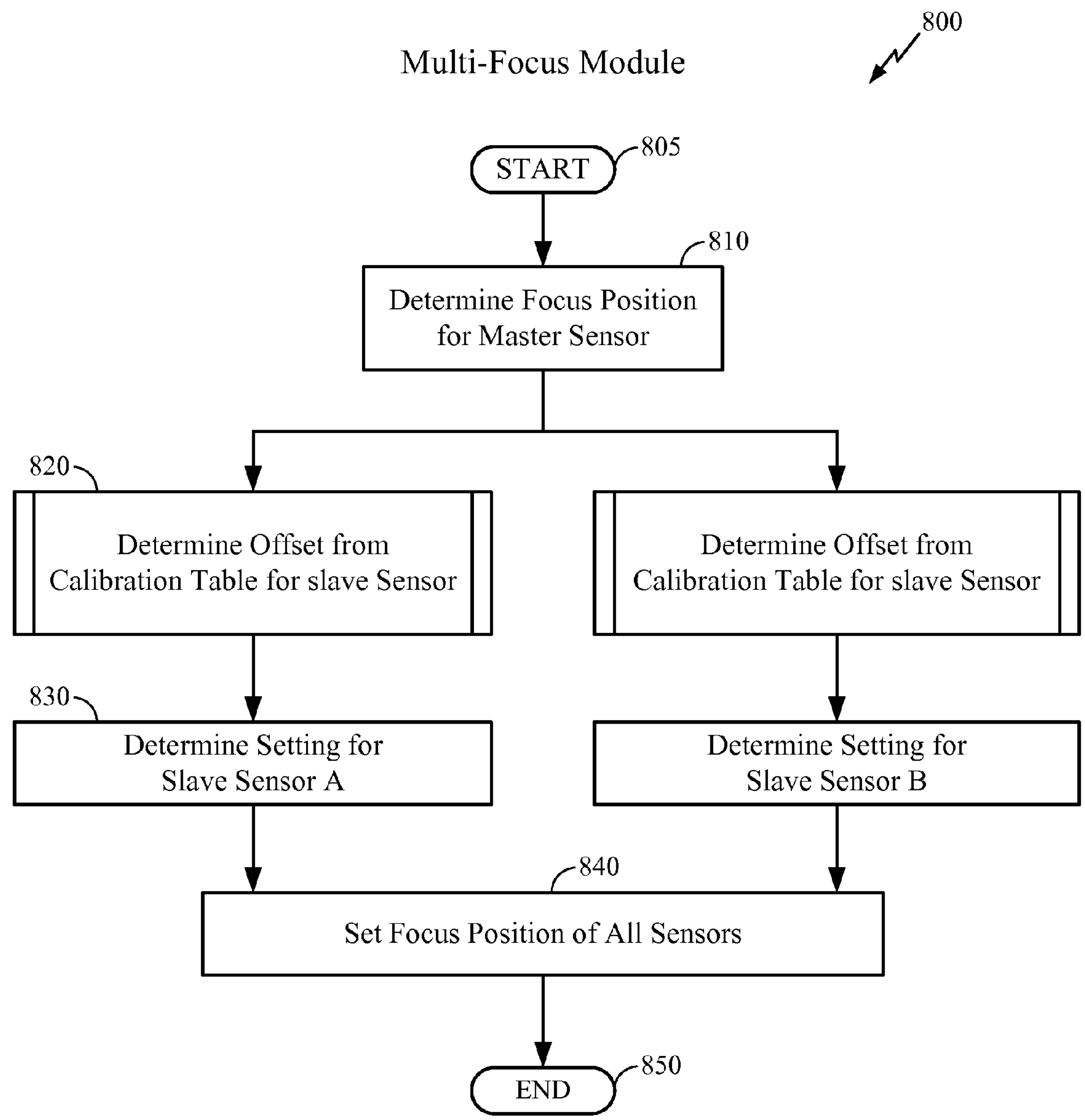
FIG. 8 is a flowchart illustrating one embodiment of a multi-focus module.

FIG. 8 is a flow chart illustrating a process 800 that runs within one embodiment of the multi-focus module 150. The multi-focus module is responsible for focusing two or more imaging sensors in support of an imaging task, for example, recording a snapshot or a video. The process 800 begins at a start state 805 and then moves to step 810 where the focus position for the master sensor is determined. The master imaging sensor is the primary sensor used to determine the focus for the remaining imaging sensors. All other imaging sensors are considered "slave" sensors. To determine the focus position of the master sensor, a number of techniques are known in the art. While both the exhaustive focus sweep and abbreviated focus sweep discussed earlier can be used, these techniques may be disfavored in some imaging applications. For example, if the current image focus is very close to optimal, it is not desirable to reset the focus position to one extent of its range, as is done with the techniques described in the algorithms illustrated by FIGS. 5-7 above. Instead, minor adjustments are made to focus the master imaging sensor. These techniques are known in the art.

Once the master imaging sensor focus position is determined in step 810, process 800 moves to step 820, where an appropriate setting for each slave sensor is determined. FIG. 8 illustrates the offset determination for each slave setting occurring in parallel in step 820. Other embodiments may perform these determinations serially, with a corresponding delay in the time required to focus all imaging sensors on the device. The offset determination process is described in detail below in the discussion of the offset determination module 170. Once the offset for each sensor is determined, process 800 moves to step 830 where the focus setting for each sensor is identified by applying the offset returned in previous step 820 to the master sensor focus position determined earlier in step 810. Process 800 then moves to step 840, where all imaging sensors are driven to their focus positions as determined in the previous steps. The imaging device is then ready to record an image with each sensor. Process 800 then moves to end step 850. Thus, the multi-focus module running process 800 represents one means for determining a focus adjustment based on a difference between a first focus setting and a second focus setting. More generally, a multi-focus module that determines the focus positions of a plurality of slave imaging sensors based on data in a calibration table and a current master imaging sensor position is another means for determining a focus adjustment based on a difference between a first focus setting and a second focus setting.

Figure 9:
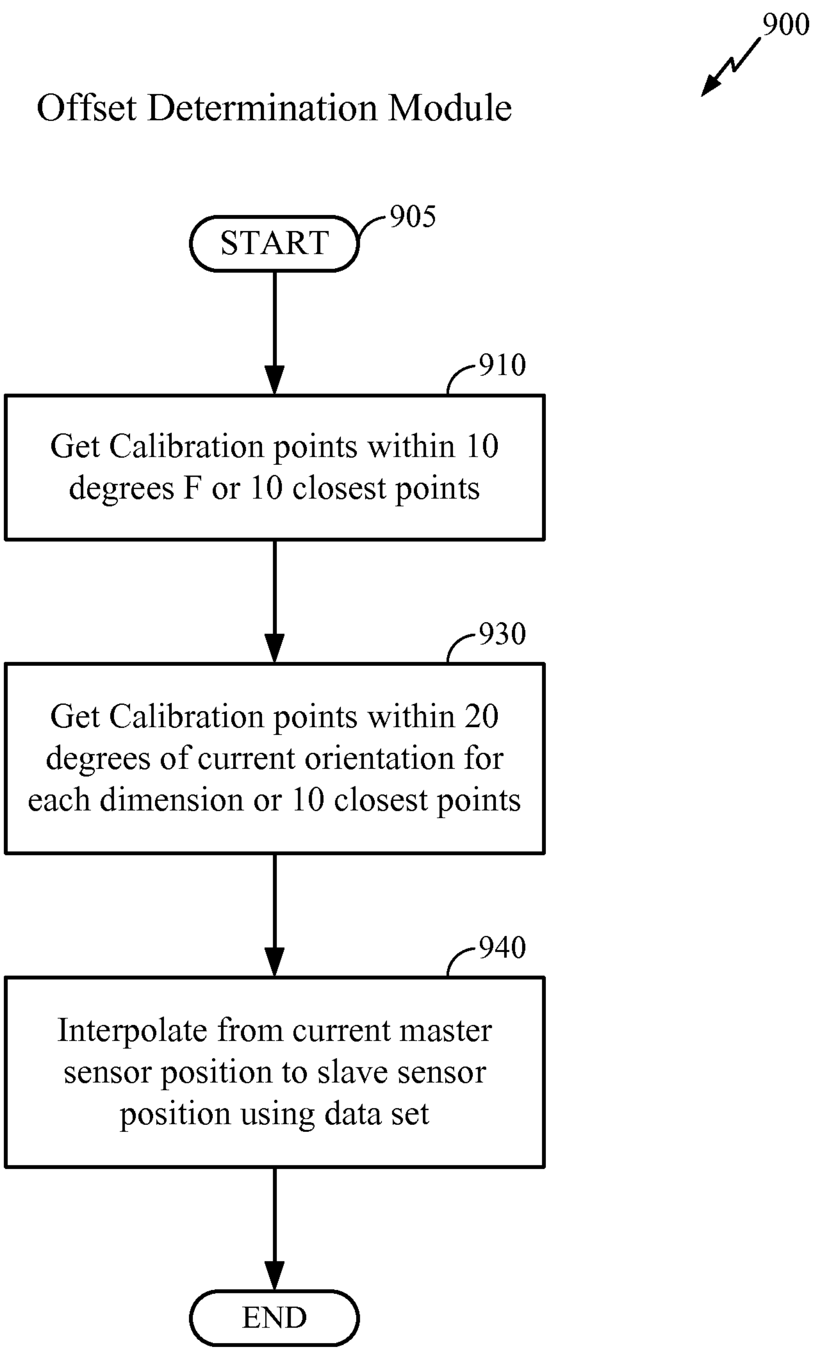
FIG. 9 is a flowchart illustrating one embodiment of an offset determination module.

FIG. 9 is a flow chart illustrating a process 900 that runs within one embodiment of the offset determination module 190. The offset determination module is responsible for determining the appropriate offset for an imaging sensor, given the current master sensor lens position, calibration table, and current orientation and temperature data. The offset determination module's task is complex because the calibration techniques described previously do not occur in a well controlled manufacturing environment with a set of focal targets at known distances. Instead, random scenes are imaged at calibration time, resulting in calibration table entries with a variety of focal positions. The focus position of calibration points will depend on the scenes perceived by the image sensor at the time the calibrations occurred.

Furthermore, the environmental conditions recorded for each calibration table entry may vary across the spectrum of possible values, or may be clustered around particular temperatures and orientations. A user living in a temperate climate may record calibration table entries within a narrow temperature range. Users located far from the equator may record more extreme variations in temperature. Orientations may also vary across users, with novice users maintaining a relatively horizontal optical axis, and advanced users recording a wider variety of orientations.

The offset determination module must determine a proper offset for the current conditions given this assortment of data. In the illustrated embodiment of FIG. 9, process 900 begins at start step 905 and then moves to step 920, where process 900 retrieves from the calibration table the up to ten calibration points closest in temperature to the current ambient temperature. Process 900 then moves to step 930, where the process 900 retrieves up to ten points with a recorded orientation closest to the current orientation. Most embodiments will use each dimension in this comparison. The aggregation of calibration entries retrieved in steps 920 and 930 may return between one and twenty unique calibration entries. Note that while the illustrated embodiment of FIG. 9 is described as retaining two groups of ten calibration points each, other embodiments may vary the number of points based on their own particular design considerations. For example, an embodiment utilizing a sensor having a wider range of manufacturing tolerances may require more points to achieve an accurate calibration.

Process 900 then moves to step 940. In step 940, a two dimensional interpolation is applied to determine an offset position given the current master image sensor focus position. Some embodiments perform a simple interpolation, giving each of the calibration points an equal weight in the interpolation. In other embodiments recording both master and slave positions in the calibration table, each calibration point is given a weight proportional to the difference between its recorded master image sensor position and the current master sensor position. Some embodiments may consider the age of the entry in its proportionality as well. After the interpolation from calibration points to a new lens position has been performed, process 900 moves to the end step 950.

One skilled in the art will recognize other embodiments. For example, calibration points with recorded lens positions differing by more than a threshold value from the current master image sensor focus position may be eliminated from the data set. However, these embodiments may limit the elimination of points to avoid reducing the number of total points below some minimum number. Similarly, some embodiments may eliminate calibration points with orientation or temperature data that differs from current temperature or orientation by some threshold, but again avoiding reduction of total points below a minimum. Alternatively, instead of eliminating entries, other embodiments may simply weigh entries based on how closely they match current environmental conditions. The mathematical techniques required to implement the above embodiments are well known in the art.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method of determining a focus adjustment for an imaging device having a plurality of cameras, comprising:

determining a plurality of calibration points, each calibration point including data derived from at least a first focus setting for a first camera, a corresponding second focus setting for a second camera, and differing environmental conditions recorded contemporaneously with the first and second focus settings;

storing the determined plurality of calibration points in a calibration table;

determining, after storing, a current focus setting for the first camera;

determining, after storing, current environmental conditions;

retrieving a subset of the plurality of calibration points from the calibration table based upon the current environmental conditions; and determining a focus adjustment for the second camera based on the current focus setting and the retrieved subset of calibration points.

2. The method of claim 1, further comprising:

determining whether a calibration point should be stored in response to an event based on whether there is already a calibration point in the calibration table for the current environmental conditions.

3. The method of claim 1, wherein retrieving comprises retrieving each of the stored calibration points in the subset from the calibration table based on a similarity between each stored calibration point's environmental conditions and the current environmental conditions.

4. The method of claim 1, further comprising determining at least a portion of the calibration points in response to an elapsing of a predetermined time between the recordation of calibration points.

5. The method of claim 1, wherein retrieving comprises retrieving each of the subset of stored calibration points from the calibration table based on a similarity between the stored calibration points' ambient temperature and a current ambient temperature.

6. The method of claim 2, further comprising storing of a difference between a first lens position and a second lens position in at least one of the plurality of calibration points, the first focus setting comprising the first lens position and the second focus setting comprising the second lens position.

7. The method of claim 1, further comprising interpolating focus positions stored in at least one of the calibration points based on the current focus position to determine the focus adjustment for the second camera.

8. The method of claim 1, also comprising deleting a calibration point from the calibration table based on an age of the calibration point.

9. The method of claim 5, wherein the stored calibration points' ambient temperature comprises an ambient temperature of the imaging device at the time the stored calibration points were determined.

10. The method of claim 5, wherein each stored calibration points' orientation indicates an orientation of the imaging device at the time the corresponding stored calibration point was determined.

11. An imaging device, comprising:

a first camera and a second camera;

a processor, configured to control the focus settings of the first camera and the second camera;

a control module configured to determine a first focus setting for the first camera and a second focus setting for the second camera in response to a predetermined event;

a sensor for determining environmental data contemporaneously with the first and second focus settings; and a memory comprising a calibration table including a plurality of calibration points, wherein the processor is configured to store the determined first and second focus settings and the determined environmental data as part of a calibration point in the calibration table, wherein the control module is configured to determine a current focus setting for the first camera, wherein the sensor is configured to determine current environmental conditions, wherein the processor is configured to retrieve a subset of the plurality of calibration points from the calibration table based upon the current environmental conditions, and wherein the processor is configured to determine a focus adjustment for the second camera based on the current focus setting and the retrieved subset of calibration points.

12. The device of claim 11, wherein the sensor comprises a temperature sensor, wherein the memory also has instructions that determine the focus adjustment also based on a measurement from the temperature sensor.

13. The device of claim 11, wherein the sensor comprises an orientation sensor, wherein the memory also has instructions that determine the focus adjustment also based on a measurement from the orientation sensor.

14. The device of claim 11, further comprising a third camera, wherein the processor is also configured to control the focus setting of the third camera.

15. The imaging device of claim 11, wherein the imaging device is integrated with a mobile phone.

16. The imaging device of claim 11, wherein the imaging device is a hand held camera.

17. A non-transitory computer-readable medium containing processor executable instructions that are operative to cause a processor to perform a method of determining a focus adjustment for an imaging device having a plurality of cameras, the method comprising:

determining a first focus setting for a first camera in response to a predetermined event;

determining a second focus setting for a second camera in response to the predetermined event;

determining environmental conditions contemporaneously with the first and second focus settings in response to the predetermined event;

storing the determined first and second focus positions and contemporaneously determined environmental conditions as one of a plurality of calibration points in a calibration table;

determining, after storing, a current focus setting for the first camera;

determining, after storing, current environmental conditions;

retrieving a subset of the plurality of calibration points from the calibration table based upon the current environmental conditions; and determining a focus adjustment for the second camera based on the current focus setting and the retrieved subset of calibration points.

18. The non-transitory computer readable medium of claim 17, wherein the processor executable instructions are operative to perform the method further comprising:

capturing an image from the first image sensor at an initial focus setting;

measuring a contrast of the captured image;

iteratively capturing additional images from the first camera at sequential focus settings until a measured contrast of a captured image differs from a maximum contrast of a captured image by a threshold;

determining the first focus setting and the second focus setting by selecting the maximum contrast image from the iteratively captured images.

19. The non-transitory computer readable medium of claim 17, the method further comprising determining the focus adjustment based at least partially on an ambient temperature of at least one of the plurality of cameras.

20. The non-transitory computer readable medium of claim 17, the method further comprising determining the focus adjustment based at least partially on an orientation of the imaging device.

21. An imaging device, comprising:

means for storing a calibration table, the calibration table including a plurality of calibration points comprising environmental data, the environmental data determined contemporaneously with a first focus setting for a first camera and a second focus setting for a second camera;

means for determining the first focus setting in response to a determined event;

means for determining the second focus setting in response to the predetermined event;

means for storing the determined first and second focus settings along with the environmental data as a calibration point in the calibration table;

means for determining a current focus setting for the first camera;

means for determining current environmental conditions;

means for retrieving a subset of the plurality of calibration points from the calibration table based upon the current environmental conditions; and means for determining a focus adjustment for the second camera based on the calibration data and the current focus setting.

* * * * *